VAN VIVIAN AERL.
TRACTOR.
APPLICATION FILED NOV. 14, 1919.
1,372,386.
Patented Mar. 22, 1921.
2 SHEETS—SHEET 1.
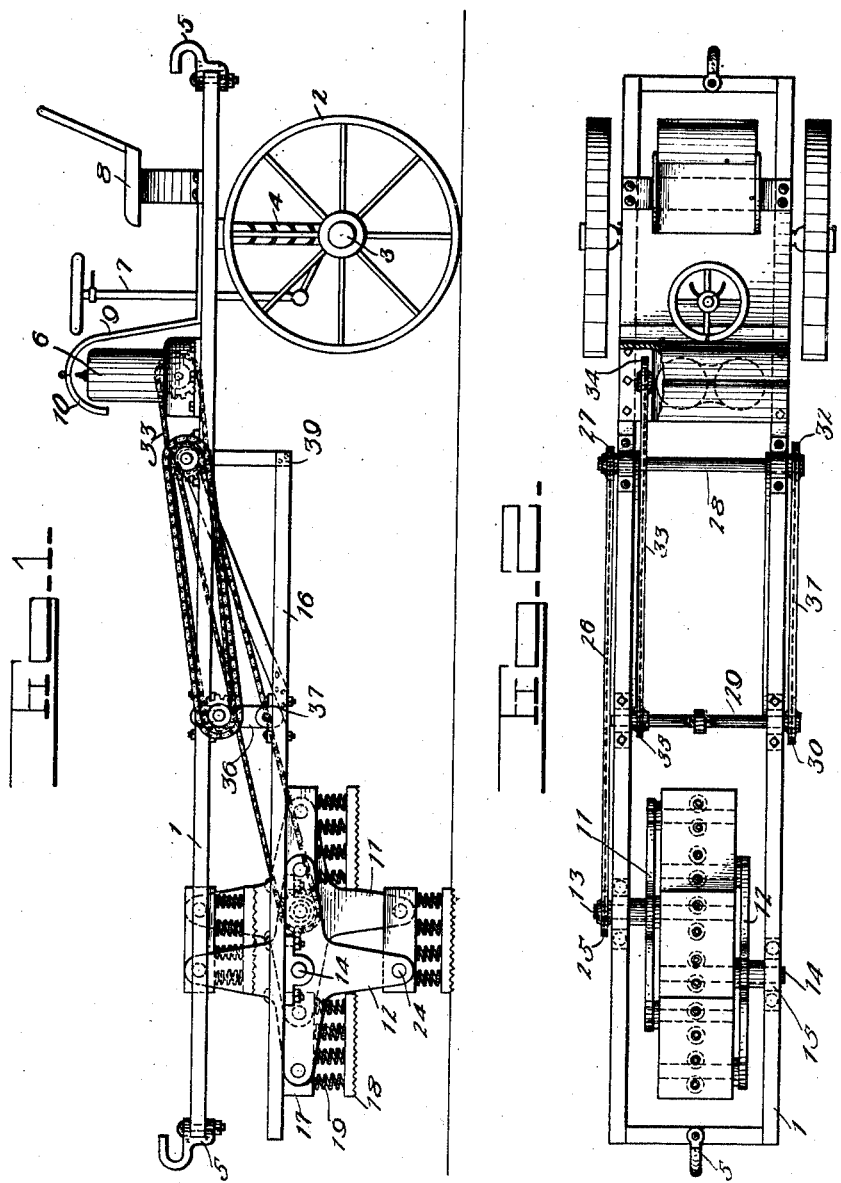
WITNESSES
John R. Woodworth
C. E. Trainor
INVENTOR
V. V. AERL
BY
ATTORNEYS VAN VIVIAN AERL.
TRACTOR.
APPLICATION FILED NOV. 14, 1919.
1,372,386.
Patented Mar. 22, 1921.
2 SHEETS—SHEET 2.
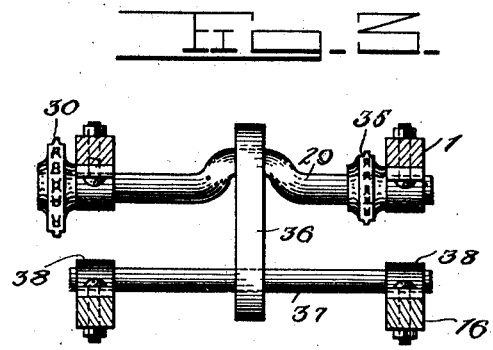
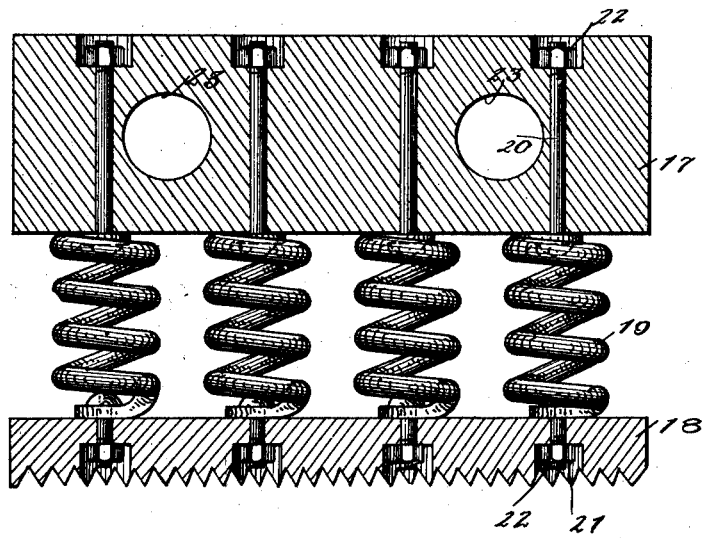
WITNESSES
INVENTOR
V. V. AERL,
BY
ATTORNEYS

UNITED STATES PATENT OFFICE.

VAN VIVIAN AERL, OF WACO, TEXAS.

TRACTOR.

1,372,386. Specification of Letters Patent. Patented Mar. 22, 1921.

Application filed November 14, 1919. Serial No. 337,970.

*To all whom it may concern:*

Be it known that I, VAN VIVIAN AERL, a citizen of the United States, and a resident of Waco, in the county of McLennan and State of Texas, have invented certain new and useful Improvements in Tractors, of which the following is a specification.

My invention is an improvement in tractors, and has for its object to provide a device of the character specified, wherein the propelling force is delivered through traction blocks, which are swung into succession into and out of engaging position with the ground, to advance the tractor.

In the drawings:—

Figure 1 is a side view of the improved tractor,

Fig. 2 is a top plan view,

Fig. 3 is a sectional view showing the crank shaft,

Fig. 4 is a section through one of the traction blocks.

In the present embodiment of the invention, a main frame 1 is provided of substantially rectangular form, supported at one end by wheels 2, which are connected with the ends of an axle 3, and this axle is connected with the frame 1 in any suitable or desired manner, springs 4 being arranged between the axle and the frame.

Coupling devices indicated at 5 are arranged at the opposite ends of the frame, and a suitable motor indicated at 6 is mounted on the frame. The axle 3 is turned by means of a steering shaft and wheel 7, which are arranged between the motor and a seat 8 for the driver.

By means of the wheel and shaft 7, the driver may steer the tractor and it will be evident that the tractor may move in either direction, either forwardly or rearwardly. A hood 9 is arranged above the motor, the hood having a hinged portion 10 at its forward end for permitting easy access to the motor.

The traction device consists of a pair of star shaped plates 11 and 12, each of which is provided at its center with a journal pin 13 and 14, respectively, and these journal pins are journaled in sectional bearings 15 on an auxiliary frame 16 which is arranged below the frame at the opposite end from the wheels 2.

Referring to Figs. 1 and 2, it will be seen that these star wheels 11 and 12 have their axes of rotation, that is, the journal pins 13—14 offset laterally with respect to each other, but parallel. The adjacent arms of the star wheels are connected by the blocks shown more particularly in Fig. 4, which are supporting feet and traction feet for the tractor.

Each of these blocks consists of a body portion or support 17, and a ground engaging portion 18 connected together in such manner that they may move toward or from each other, but are normally spring pressed away from each other. The portions 17—18 of the block are connected by springs 19 which are arranged between the portions and are connected to the portions 17—18 by bolts 20 and 21, respectively. The ends of the springs are flattened and have openings through which the bolts pass, and each bolt is engaged by a nut 22 at the end remote from the spring, the said nuts being countersunk as shown.

Openings 23 are provided through the body portion 17 of the block for engagement by bolts or pins 24 which pivotally connect the blocks to the arms of the star wheels. The shaft or journal pin 13 of the star wheel 11 has a sprocket wheel 25 which is connected by a chain 26 with a sprocket wheel 27 on a shaft 28 mounted on the main frame.

A crank shaft 29 is journaled transversely of the main frame beneath the same, and the end of this shaft remote from the sprocket chain 26 has a sprocket wheel 30 which is connected by a chain 31 with a wheel 32 on the opposite end of the shaft 28 from the wheel 27. The crank shaft 29 is driven by a sprocket chain 33 which connects the sprocket wheel 34 on the motor shaft with a sprocket wheel 35 on the crank shaft.

A link 36 connects the crank of the crank shaft with the auxiliary frame, the said link being connected at one end to the crank, and at the other to a shaft 37 which is journaled on the side members of the auxiliary frame in bearings 38. The auxiliary frame is pivotally connected at its inner end to the main frame as indicated at 39.

In operation, when the motor is in operation, the shaft 29 will be rotated, and through the connections 30—31—32 the shaft 28 will be rotated. The shaft 28 will rotate the star wheel 11, and through the block connection the star wheel 12 will be rotated therewith.

As the star wheels rotate, the blocks will be brought in succession into engagement with the ground to support the adjacent end of the frame, and to advance the frame. Each block will engage the ground with its bottom surface substantially parallel with the ground surface, and it will be noticed that the ground engaging portion 18 has its undersurface toothed to secure a firm grip.

The provision of the auxiliary frame hinged to the main frame will permit the insertion of springs between the auxiliary frame and the main frame to cushion any shock and jar that might be between said frames.

I claim:

1. In a tractor, a main frame having guiding wheels and carrying a motor, an auxiliary frame pivoted to the main frame at one end to swing freely at the other end with respect thereto, star wheels journaled on the auxiliary frame one in advance of the other, traction blocks supported between the corresponding arms of the star wheels and pivoted thereto, a driving connection between the star wheels and the motor, and means controlled by the motor for raising and lowering that end of the main frame adjacent to the star wheels to hold the same level during the movement of the star wheel, said connection comprising a crank shaft on the main frame driven by the motor, and a link connecting the crank shaft with the auxiliary frame.

2. In a tractor, a main frame having guiding wheels and carryring a motor, an auxiliary frame pivoted to the main frame at one end to swing freely at the other end with respect thereto, star wheels journaled on the auxiliary frame one in advance of the other, traction blocks supported between the corresponding arms of the star wheels and pivoted thereto, a driving connection between the star wheels and the motor, and means controlled by the motor for raising and lowering that end of the main frame adjacent to the star wheels to hold the same level during the movement of the star wheel, each of said blocks consisting of a body portion pivoted to the star wheels, and a ground engaging portion spring supported from the body portion.

3. In a tractor, a main frame having guiding wheels and carrying a motor, an auxiliary frame pivoted to the main frame at one end to swing freely at the other end with respect thereto, star wheels journaled on the auxiliary frame one in advance of the other, traction blocks supported between the corresponding arms of the star wheels and pivoted thereto, a driving connection between the star wheels and the motor, and means controlled by the motor for raising and lowering that end of the main frame adjacent to the star wheels to hold the same level during the movement of the star wheel.

4. In a tractor, the combination with the main frame, of an auxiliary frame pivoted thereto at one end of the auxiliary frame, a pair of star wheels journaled on the auxiliary frame one in advance of the other, traction blocks pivoted to the corresponding arms of the star wheels and supported between the star wheels, means for driving the star wheels, and means on the main frame for moving said frames toward and from each other for the purpose specified, each of the blocks comprising a body portion pivoted to the star wheels, and a ground engaging portion spring supported from the body portion.

5. In a tractor, the combination with the main frame, of an auxiliary frame pivoted thereto at one end of the auxiliary frame, a pair of star wheels journaled on the auxiliary frame one in advance of the other, traction blocks pivoted to the corresponding arms of the star wheels and supported between the star wheels, means for driving the star wheels, and means on the main frame for moving said frames toward and from each other, for the purpose specified.

6. In a tractor, a main frame having guiding wheels at one end, and a tractor wheel at the other end, said tractor wheel carrying ground engaging blocks adapted to engage the ground in succession, an auxiliary frame carrying the tractor wheel and pivoted to the main frame, and means controlled by the forward movement of the main frame for moving said frames toward and from each other, for the purpose specified.

7. A tractor comprising a frame, having at one end guiding wheels and at the other a series of blocks mounted to revolve about a common axis transverse to the main frame and below the same and to engage the ground successively, an auxiliary frame supporting the blocks and mounted to move toward and from the main frame, and means controlled by the moving of the blocks for moving said frames toward and from each other.

VAN VIVIAN AERL.